United States Patent [19]

Morgan et al.

[11] Patent Number: 5,324,346

[45] Date of Patent: Jun. 28, 1994

[54] PAINT COMPOSITION CONTAINING FERROPHOSPHORUS

[75] Inventors: Russell J. Morgan, Grand Island; Gerald L. Evarts, Tonawanda, both of N.Y.

[73] Assignee: Occidental Chemical Corporation, Niagara Falls, N.Y.

[21] Appl. No.: 122,989

[22] Filed: Sep. 20, 1993

[51] Int. Cl.$^5$ ............................................. C09D 5/08
[52] U.S. Cl. ............................ 106/14.05; 106/14.41; 106/14.44; 106/456
[58] Field of Search ............... 106/1.29, 14.05, 456, 106/14.44, 14.41

[56] References Cited

U.S. PATENT DOCUMENTS

| | | | |
|---|---|---|---|
| 3,562,124 | 2/1971 | Leon et al. | 428/328 |
| 3,884,705 | 5/1975 | Blair | 106/14.05 |
| 4,119,763 | 10/1978 | Blair | 428/563 |
| 4,728,462 | 3/1988 | Miller et al. | 252/513 |
| 4,794,050 | 12/1988 | Campbell et al. | 428/551 |
| 4,828,614 | 5/1989 | Miller et al. | 106/1.29 |
| 4,889,773 | 12/1989 | Campbell et al. | 106/1.29 |
| 5,064,468 | 11/1991 | Okai et al. | 106/14.05 |

FOREIGN PATENT DOCUMENTS 4011897 10/1991 Fed. Rep. of Germany ...... 106/456

OTHER PUBLICATIONS

Phosphorus And Its Compounds, vol. II, J. R. Van Wazer (1961), pp. 970–985.

*Primary Examiner*—Anthony Green
*Attorney, Agent, or Firm*—Wayne A. Jones; Richard D. Fuerle

[57] ABSTRACT

Disclosed is a paint composition of about 50 to about 95 wt % of a pigment, about 5 to about 50 wt % of a binder and sufficient solvent to give a solids content of about 30 to about 100 wt %. The pigment has two components—about 0 to about 90 wt % zinc and about 10 to about 100 wt % of a particular type of ferrophosphorus. The ferrophosphorus of this invention contains about 45 to about 63 wt % iron, about 20 to about 35 wt % phosphorus, about 2 to about 10 wt % vanadium, and about 1 to about 10 wt % chromium.

20 Claims, 7 Drawing Sheets

PAINT COMPOSITION CONTAINING FERROPHOSPHORUS

BACKGROUND OF THE INVENTION

This invention relates to a paint composition that contains a particular type of ferrophosphorus. The ferrophosphorus used in the paint compositions of this invention contains relatively high concentrations of vanadium and chromium.

In the production of phosphorus and various phosphates, rocks high in phosphate content are ground, washed and formed into nodules. The nodules are heated in an arc furnace with coke and sand to reduce the phosphates to elemental phosphorus. The elemental phosphorus distills off and a product known as ferrophosphorus, a mixture of compounds of iron and phosphorus, forms beneath a layer of slag. The ferrophosphorus is a by-product which has been used in paints, welding compositions, and as a source of phosphorus in making steel.

Zinc dust is included in paint compositions for the purpose of reducing the corrosion of steels that the paint is applied to. The zinc is effective because it corrodes before the iron in the steel does and acts as a sacrificial metal. Ferrophosphorus is much less expensive than zinc and it has been found that some of the zinc in these paints can be replaced by ferrophosphorus without significantly reducing the effectiveness of the paint. Until now, ferrophosphorus that has been used for this purpose in paint has come from phosphate rock mined in the eastern portions of the United States.

SUMMARY OF THE INVENTION

We have discovered that ferrophosphorus from phosphate rock mined in the western portion of the United States is significantly more effective in paints in preventing the corrosion of steel than is ferrophosphorus from phosphate rock mined in the eastern portion of the United States. The phosphate rock from the western United States contains much larger percentages of vanadium and chromium than does the phosphate rock from the eastern United States.

Since vanadium and chromium corrode less readily than iron does, one might expect that ferrophosphorus containing large quantities of vanadium and chromium would be less effective in paints in preventing the corrosion of iron than ferrophosphorus containing small quantities of vanadium and chromium. However, for some reason, as yet unexplained, that is not the case.

DESCRIPTION OF THE PREFERRED EMBODIMENT

Figure 1E:
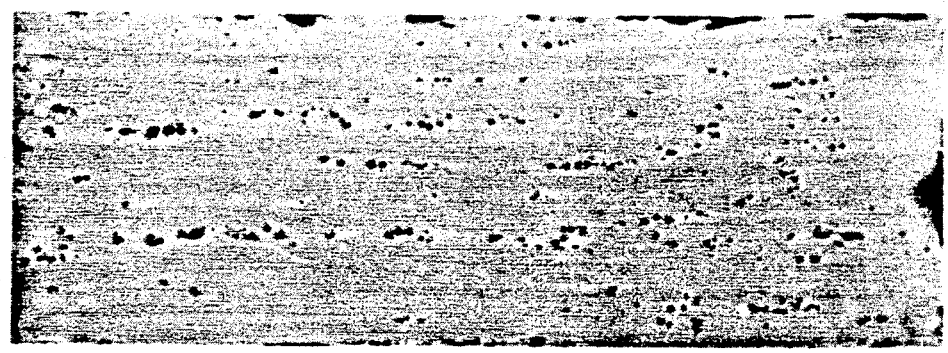
FIGS. 1A, 1B, 1C, 1D, 1E, 2A, 2B, 2C, 2D, 2E, 2F, 3A, 3B, 3C, 3D, 3E, 3F, 4A, 4B, 4C, 4D, 4E, and 4F are photographs of steel panels that have been coated with various paint compositions, then exposed to a salt fog in a test cabinet. A description of these experiments can be found in the Examples that follow.
Figure 1D:
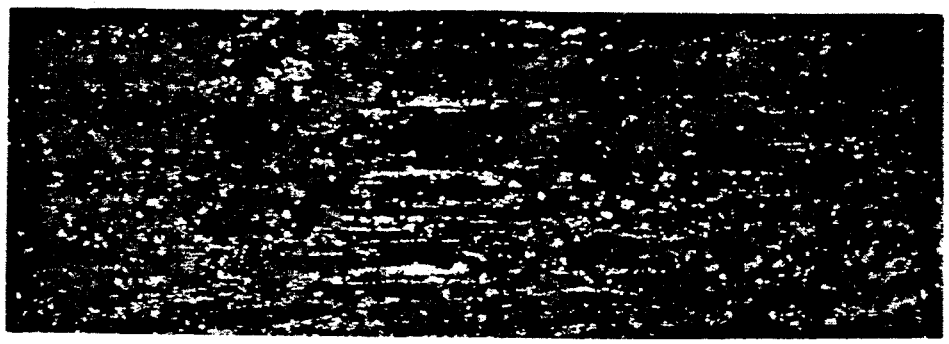
Figure 1C:
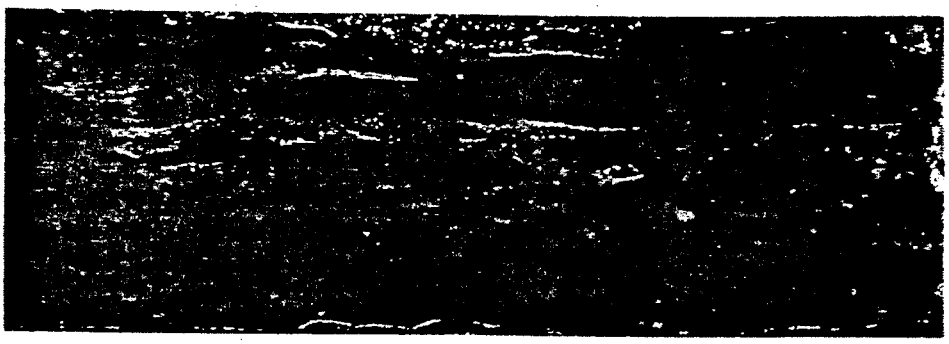
Figure 1B:
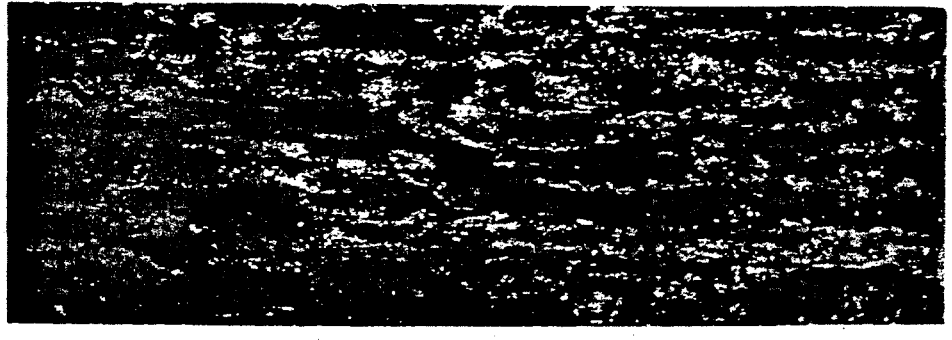
Figure 1A:
Figure 2C:
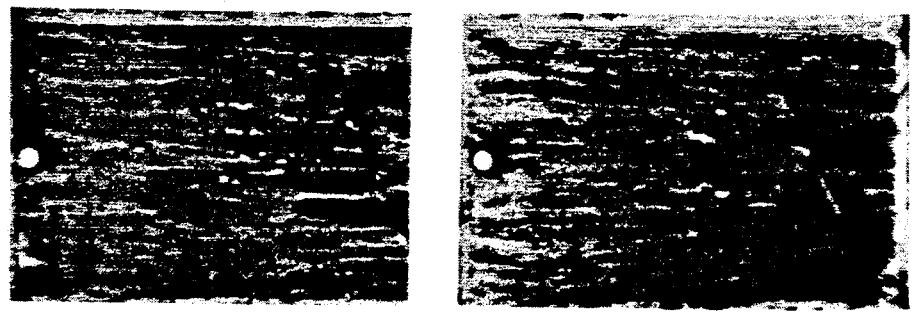
Figure 2B:
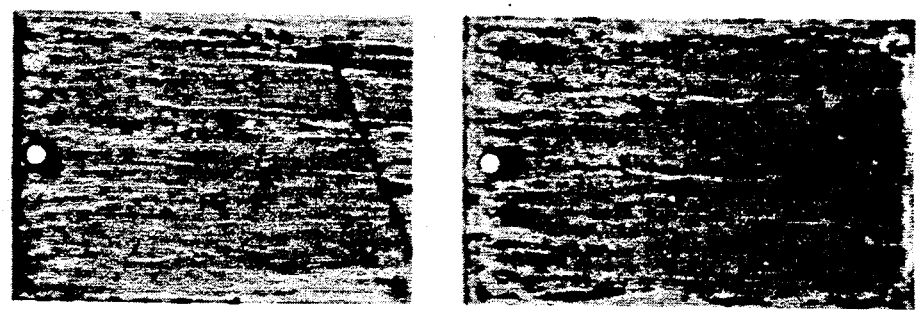
Figure 2A:
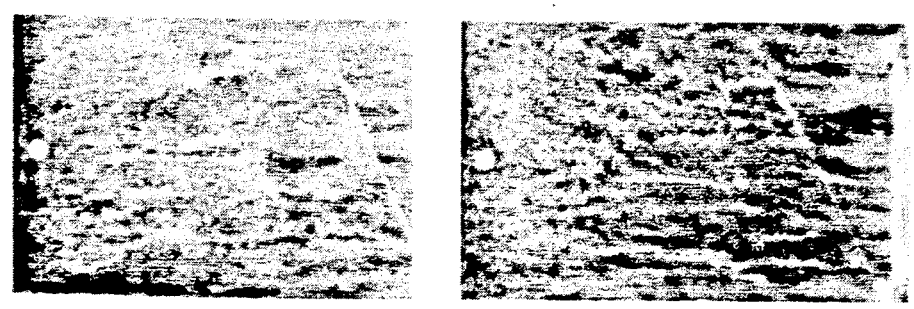
Figure 2F:
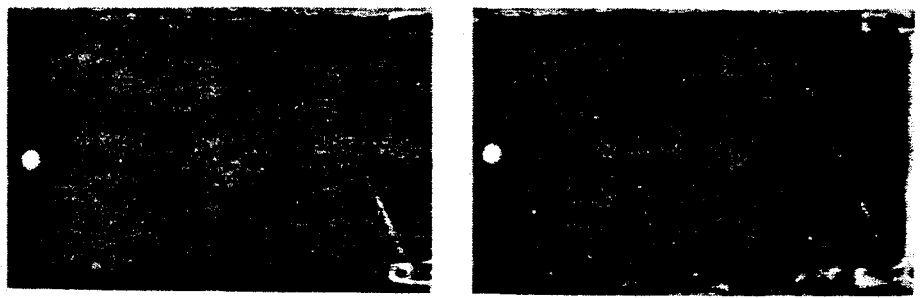
Figure 2E:
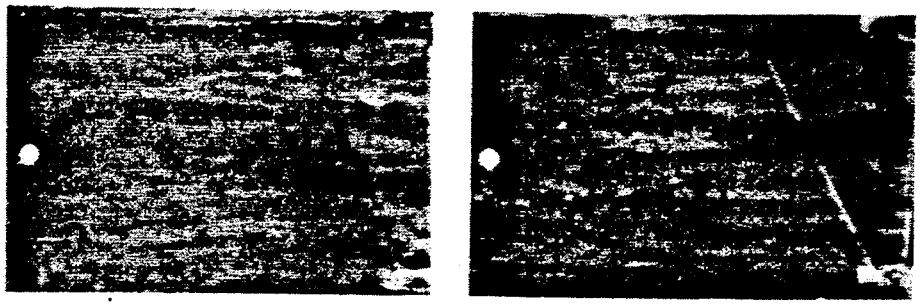
Figure 2D:
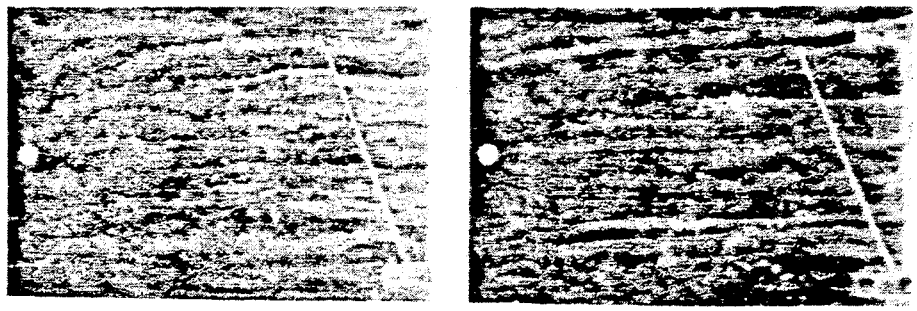
Figure 3C:
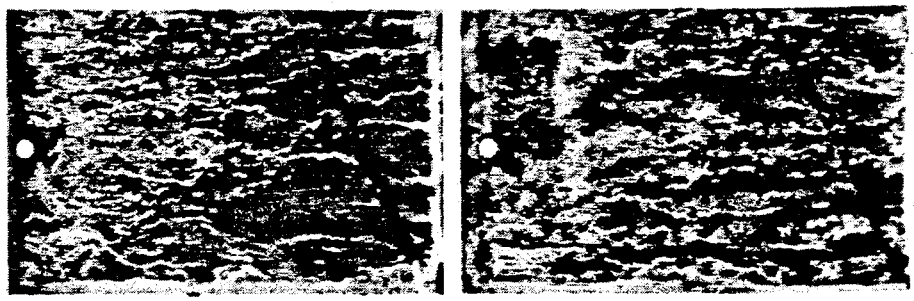
Figure 3B:
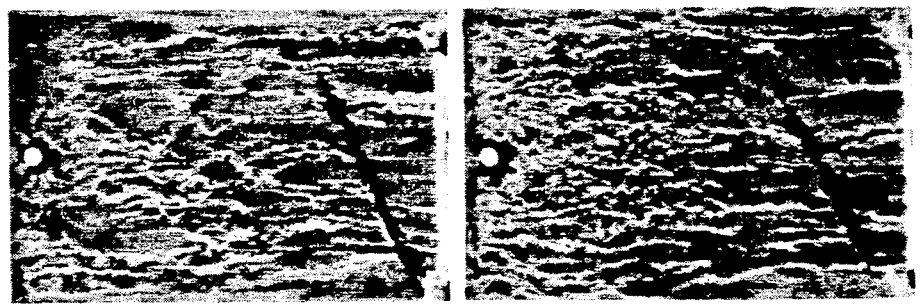
Figure 3A:
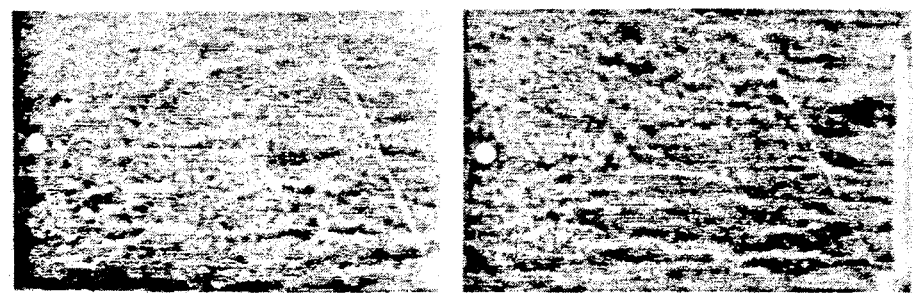
Figure 3F:
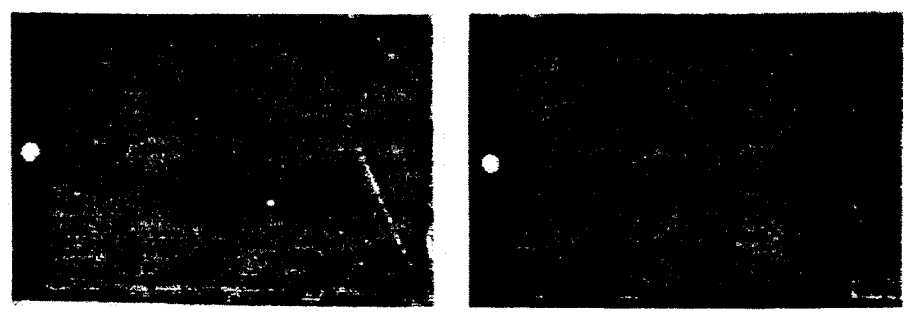
Figure 3E:
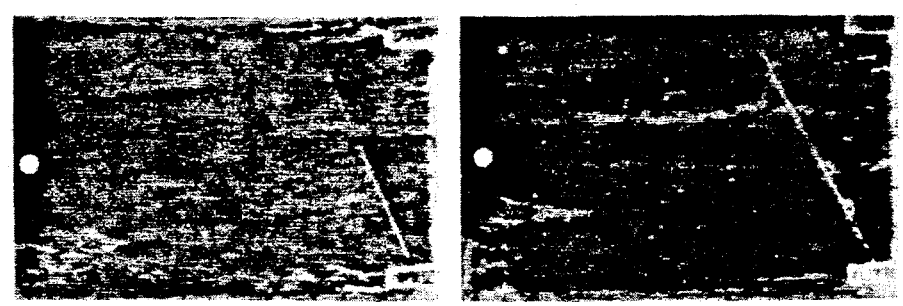
Figure 3D:
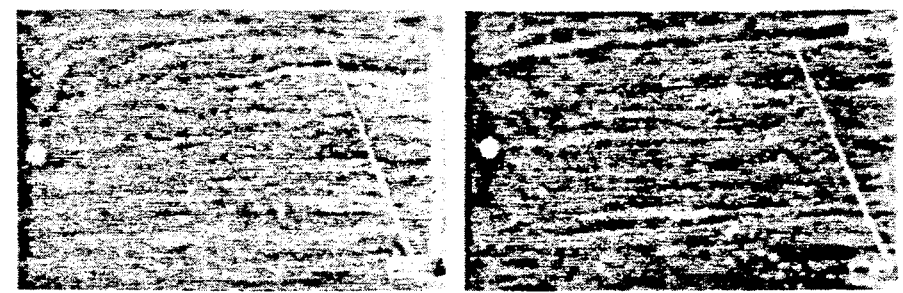

The paint compositions of this invention contain a pigment, a binder, a solvent and various optional ingredients. The pigment is made up of insoluble particulates that provide, inter alia, corrosion protection and film integrity. The amount of pigment in the composition is about 50 to about 95 wt % of the dry paint film. If less pigment is used, the corrosion protection is inadequate, and if more pigment is used the paint may have poor adhesion due to insufficient binder. The preferred amount of pigment is about 60 to about 92 wt %.

The pigment portion of the composition contains one or more components. The first component of the pigment is zinc dust, which can constitute about 0 to about 90 wt %, and preferably about 50 to about 90 wt %, of the weight of the pigment. The second component of the pigment is the special pigment grade ferrophosphorus of this invention. The ferrophosphorus component of the pigment constitutes about 10 to about 100 wt % of the pigment, and preferably about 10 to about 50 wt %. The special ferrophosphorus of this invention is a mixture of various compounds of iron and phosphorus with significant quantities of chromium and vanadium plus small amounts of various other impurities. About 45 to about 70 wt % of the ferrophosphorus is iron, and preferably about 50 to about 65 wt %, is iron; about 20 to about 35 wt %, and preferably about 22 to about 32 wt %, is phosphorus; about 1 to about 10 wt %, and preferably about 4 to about 9 wt %, is vanadium; and about 2 to about 10 wt %, and preferably about 4 to about 9 wt %, is chromium. Small amounts (i.e., up to 2 wt %) of silicon, nickel, titanium, manganese, molybdenum, tin, aluminum, cobalt, calcium, copper and magnesium can also be present in the ferrophosphorus. The ferrophosphorus of this invention can be obtained as a commercial product from companies that mine phosphate rock in western states such as Idaho and Montana. Up to about 20% of the pigment can be an extender pigment such as iron oxide, mica, calcium carbonate, aluminum magnesium silicate, or barium sulfate.

The paint composition of this invention includes about 5 to about 50 wt %, based on dry film, of a binder. The binder can be of a type that forms an inorganic compound in the paint, or a type that forms an organic compound in the paint. Examples of binders that form inorganic compounds in the paint include ethyl silicates, sodium silicates, potassium silicate, phosphates, and butyl titanates. Examples of binders that form organic compounds in the paint include epoxy esters, epoxy polyamides, urethanes, acrylics, phenoxies, chlorinated rubbers, polyvinyl butryral, polyvinyl acetates, and polystyrene. The preferred binders are alkali metal and ethyl silicates, epoxies and urethanes. The preferred amount of binder is about 6 to about 38 wt %.

The paint composition also includes sufficient solvent to give a solids content of about 30 to 100 wt % (i.e., up to 70 wt % solvent). The solvent should dissolve the binder, but will not dissolve the pigment. Examples of suitable solvents include xylene, isopropyl alcohol, water, toluene, alcohols, cellosolve acetate and methyl-ethyl ketone. Xylene, toluene and mixtures thereof are preferred for epoxy and urethane based paints and alcohols, and xylene and mixtures thereof are preferred for silicate based paints. Water is the solvent of choice for all water based binders.

Various additives can also be included in the paint composition. The composition preferably includes an anti-settling agent, such as a thixatrope, in an amount of about 1 to about 2 wt %, based on dry film weight. Examples of suitable anti-settling agents include fumed silica, montmorillenite clay and liquid waxes. If the binder is an epoxy ester resin, it is also normally necessary to include a dryer for the epoxy resin, such as cobalt naphthanate, to crosslink the epoxy resin. About 0.01 to about 1 wt % of the dryer is typically used.

The following examples further illustrate this invention.

EXAMPLE 1

Paint compositions were prepared from 62 grams "Epitex 183" epoxy resin from Interrez (50% nonvolatile resin), 10 grams of a 50/50 vol. mixture of xylene and toluene, 0.8 grams "Cab-O-Sil" colloidal silica from Cabot Chemical Corp., and various types of ferrophosphorus. The amount of ferrophosphorus used was selected so that the weight, volume or oil adsorption characteristics of the different compositions could be comparable. The following table gives the type of ferrophosphorus used and the amount.

| Ferrophosphorus Source | Amount (g) |
|---|---|
| Occidental Chemical Corp. Ferrophos HRS 2131 | 225 |
| Source B | 250 |
| Source D | 225 |
| Control | — |

The control contained no ferrophosphorus but instead contained 250 gms Zinc Dust No. 122 from Zinc Corporation of America.

The analysis of the various ferrophosphoruses used in these compositions is given in the following table. In the table the results are given in ppm unless otherwise indicated.

|  | Oxy 2131 | Source A | | Source B | | Source C | | Source D | |
|---|---|---|---|---|---|---|---|---|---|
|  |  | Oxy Anal. | Anal. | Oxy Anal. | Anal. | Oxy Anal. | Anal. | Oxy Anal. | Anal. |
| Fe | 67% | 59–62% | — | 60% | 65.5% | 57.6% | 51–57% | 71.7% | — |
| P | 24.5% | 22–29% | — | 28% | 25.8% | 26% | 28–29% | 24.6% | — |
| Cr | 500 | 5.1–5.3% | — | 5.5% | 3% | 6.3% | 6–7% | 2568 | — |
| V | 100 | 4.9–5.2% | — | 4.5% | 2.3% | 7.3% | 8–9% | 3423 | — |
| Si | 3.5% | 0.2–9% | — | 420 | 1.3% | 1800–2500 | <1% | 663 | — |
| Ni | 270 | 0.7% | — | 2900 | — | 0.7% | 1–3% | 1200 | — |
| Ti | 1.6% | 1.1% | — | 1.3% | — | 1.4% | — | 2.3% | — |
| Mn | 1.7% | 1700 | — | — | — | 1600–1900 | <1% | 5028 | — |
| Mo | 55 | — | — | — | — | 450–520 | — | — | — |
| Sn | <5 | — | — | — | — | — | 1–2% | — | — |
| Al | 275 | — | — | — | — | 250 | — | — | — |
| Co | 160 | — | — | — | — | 180–210 | — | — | — |
| Ca | .47% | — | — | — | — | 7800 | — | — | — |
| Cu | 50 | 3360 | — | 4200 | — | 4500 | — | 1700 | — |
| Mg | 30 | — | — | — | — | 55 | — | — | — |

The "Oxy Anal." is our own analysis.
The "Anal." is the analysis performed by the supplier.

In the above table, the ferrophosphoruses from Sources A, B, and C were obtained from the western portion of the United States and are within the scope of this invention because they contain 1 to 10 wt % vanadium and 2 to 10 wt % chromium. Oxy 2131 ferrophosphorus and the ferrophosphorus from Source D are not within the scope of this invention.

The electrical resistivity of the dry pigment was measured by placing 5 gm of the pigment in glass tubes which had copper bases. A brass bolt was pressed against the powder in each tube at about same pressure. The paints as described in Example 1 were applied to steel panels and dried and the resistivity between a conductor placed on top of the paint and the panel was measured ($\Omega$) and the resistivity between the two $\frac{7}{8}"$ square copper electrodes $\frac{3}{8}"$ apart pressed against the surface of the paint was also measured ($\Omega\square$). Steel panels coated with the paint were exposed in a salt fog cabinet run according to ASTM test B117. Some of the panels had a scratch ("Scribe") through the paint surface on them. The panels were evaluated visually on a scale from 0 (100% of surface area rusted) to 10 (none of surface area rusted). The following table gives the results of these tests.

|  | Dry Pigment $\Omega$/5 grams | Dry Paint Film 1–1.5 mil | | Salt Fog ASTM B117* | | | |
|---|---|---|---|---|---|---|---|
|  |  |  |  | 1 Hour | 4 Hours | 22 Hours | |
| Ferrophosphorus |  | $\Omega$ | $\Omega\square$ | Face | Face | Scribe | Face |
| Oxy 2131 | 3–20 | .5 | .6 | 10,10 | 6,6+ | 0 | 4,5 |
| Source A | 1–2 | — | — | — | — | — | — |
| Source B | .5 | 2.7 | 5–8 | 10,10 | 10,10 | 0 | 7,8 |
| Source C | 1–2 | — | — | — | — | — | — |
| Source D | 10–20 | 4.8 | 8–14 | 10,10 | 7,6– | 0 | 5,4 |
| None-(Zinc) | — | 2.8M | .5M–1.2M | 10,10 | 10,10– | 0 | 9,8– |

The table shows that the dry ferrophosphorus pigment from the western states is more conductive than the other ferrophosphoruses, but other significant differences do not show up in this table. However, photographs were taken of the test panels which demonstrates the significant differences in corrosion protection on automotive quality steel, among the various paints. The following table is a key to the photographs which are shown in FIGS. 1A, 1B, 1C, 1D, and 1E.

| FIG. | Coating Thickness (mils) | Pigment |
|---|---|---|
| 1A | — | No Coating |
| 1B | 1.0–1.3 | Oxy 2131 ferrophosphorus |
| 1C | 1.2–1.6 | Source B ferrophosphorus |
| 1D | 0.7–1.1 | Source D ferrophosphorus |
| 1E | 1.0–1.2 | Zinc |

These photographs show very dramatically that the ferrophosphorus that contains a high percentage of vanadium and chromium (panel C) was significantly more effective in a paint in protecting steel from corrosion than were the other ferrophosphoruses.

EXAMPLE 2

Figure 4C:
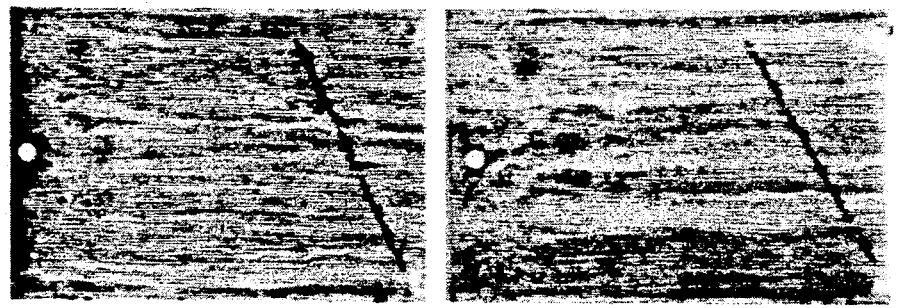
Figure 4B:
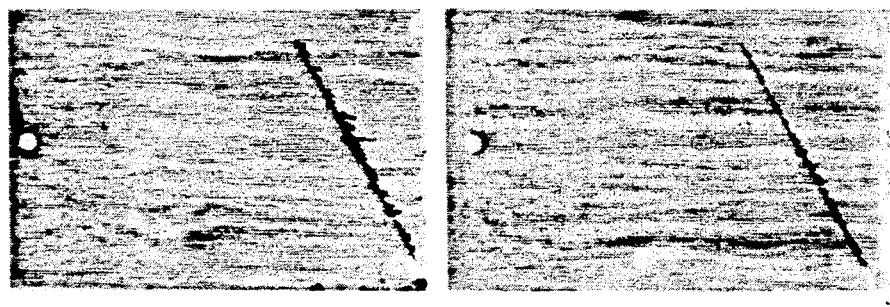
Figure 4A:
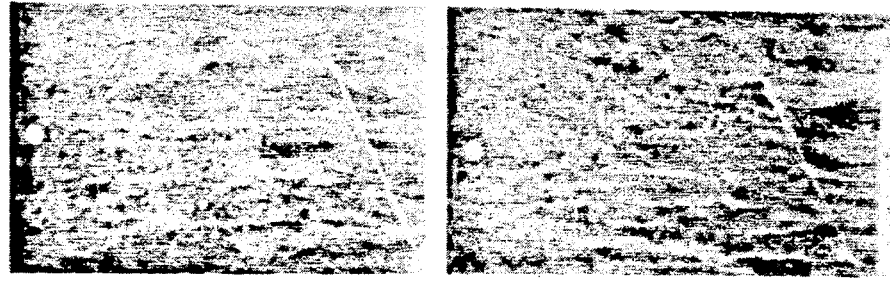
Figure 4F:
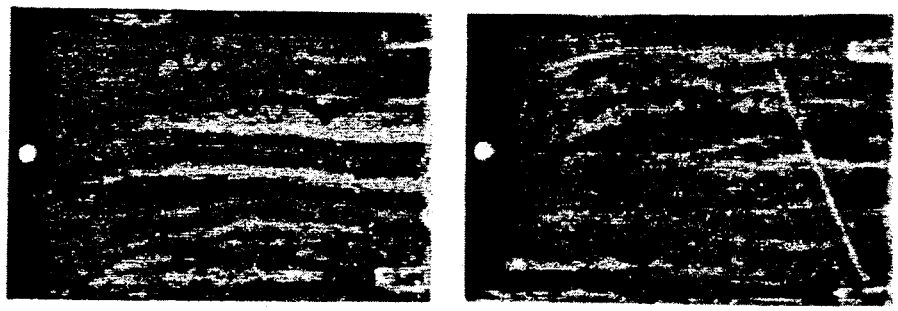
Figure 4E:
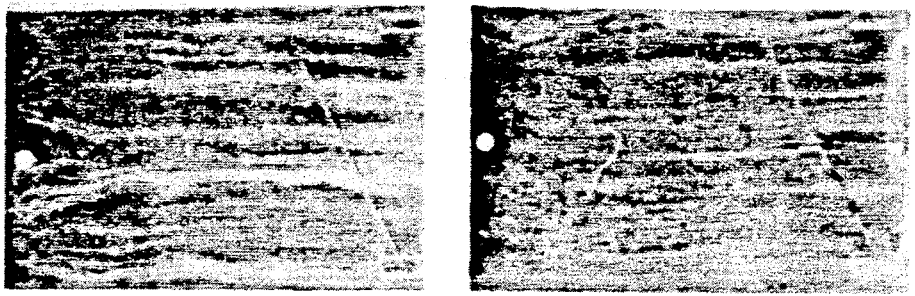
Figure 4D:
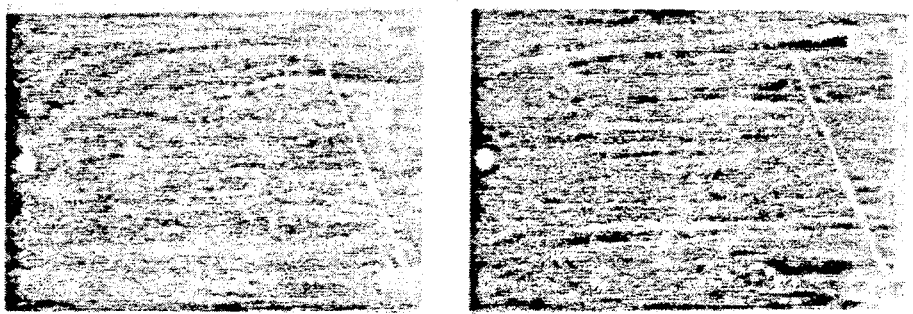

Example 1 was repeated using a 2-component ethyl silicate based self-curing primer from Carboline Co. called "Carbo Zinc 11." One component contained the binder and the second contained the zinc filler component. Different volume percentages of the zinc component were replaced with various types of ferrophosphorus and panels were painted and tested for 2000 hours as in Example 1. In FIG. 2A, 2B, 2C, 2D, 2E, and 2F, the Oxy HRS 2131 ferrophosphorus was used, in FIGS. 3A, 3B, 3C, 3D, 3E, and 3F, Source D ferrophosphorus was used, and in FIGS. 4A, 4B, 4C, 4D, 4E, and 4F Source B ferrophosphorus was used. Two panels were tested at each concentration of pigment. In panels A (FIGS. 2A, 3A, and 4A) B (FIGS. 2B, 3B, and 4B), and C (FIGS. 2C, 3C, and 4C) the films were 1 to 1.5 mils thick and in panels D (FIGS. 2D, 3D, and 4D), E (FIGS. 2E, 3E, and 4E), and F (FIGS. 2F, 3F, and 4F) the films were 2.5 to 3 mils thick. Panels A and D were 100% zinc, panels B and E were vol % zinc 15 vol % ferrophosphorus, and panels C and F were 70 vol % zinc—30 vol % ferrophosphorus. FIGS. 2A to 2F, 3A to 3F, and 4A to 4F demonstrate that the ferrophosphorus of this invention (FIGS. 4A to 4F) is more effective in paints in preventing corrosion than is ferrophosphorus outside the scope of this invention (FIGS. 2A to 2F and 3A to 3F).

We claim:

1. A dry paint film composition comprising
   (A) about 50 to about 95 wt % of a pigment which comprises
      (1) about 0 to about 90 wt % zinc; and
      (2) about 10 to about 100 wt % ferrophosphorus which comprises
         (a) about 45 to about 70 wt % iron;
         (b) about 20 to about 35 wt % phosphorus;
         (c) about 1 to about 10 wt % vanadium; and
         (d) about 2 to about 10 wt % chromium; and
   (B) about 5 to about 50 wt % of a binder.

2. A dry paint film composition according to claim 1 which comprises
   (A) about 60 to about 92 wt % of a pigment which comprises
      (1) about 50 to about 90 wt % zinc; and
      (2) about 10 to about 50 wt % of a ferrophosphorus which comprises
         (a) about 50 to about 65 wt % iron;
         (b) about 22 to about 32 wt % phosphorus;
         (c) about 4 to about 9 wt % vanadium; and
         (d) about 4 to about 9 wt % chromium;
   (B) about 6 to about 38 wt % of a binder; and
   (C) about 1 to about 2 wt % of an anti-settling agent.

3. A dry paint film composition according to claim 1 wherein about 50 to about 90 wt % of said pigment is zinc.

4. A paint composition comprising
   (A) about 50 to about 95 wt % based on solids of a pigment which comprises
      (1) about 0 to about 90 wt % zinc; and
      (2) about 10 to about 100 wt % ferrophosphorus which comprises
         (a) about 45 to about 70 wt % iron;
         (b) about 20 to about 35 wt % phosphorus;
         (c) about 2 to about 10 wt % vanadium; and
         (d) about 2 to about 10 wt % chromium;
   (B) about 5 to about 50 wt % based on solids of a binder; and
   (C) sufficient solvent to give a solids content of about 30 to about 100 wt %.

5. A paint composition according to claim 4 wherein said binder forms an inorganic compound when said paint is dry.

6. A paint composition according to claim 4 wherein said binder forms an organic compound when said paint is dry.

7. A paint composition according to claim 4 wherein said binder is selected from the group consisting of ethyl silicate, sodium silicate, potassium silicate, phosphates, butyltitanates, and mixtures thereof.

8. A paint composition according to claim 4 wherein said binder is selected from the group consisting of epoxy esters, epoxy polyamides, urethanes, acrylics, phenoxies, chlorinated rubbers, polyvinylbutyrols, polyvinylacetates, and polystyrenes.

9. A paint composition according to claim 4 wherein about 50 to about 90 wt % of said pigment is zinc.

10. A paint composition according to claim 4 wherein said binder is an epoxy and solvent is xylene, toluene, or a mixture thereof.

11. A paint composition according to claim 4 wherein said binder is silicate based and said solvent is xylene, an alcohol, or a mixture thereof.

12. A paint composition according to claim 4 which includes about 1 to about 2 wt % of an anti-settling agent.

13. A paint composition according to claim 4 wherein said binder is an epoxy resin which includes about 0.01 to about 1 wt % of a dryer.

14. A paint composition comprising
   (A) about 60 to about 92 wt % based on solids of a pigment which comprises
      (1) about 50 to about 90 wt % zinc; and
      (2) about 10 to about 50 wt % of a ferrophosphorus which comprises
         (a) about 50 to about 65 wt % iron;
         (b) about 22 to about 32 wt % phosphorus;
         (c) about 4 to about 9 wt % vanadium; and
         (d) about 4 to about 9 wt % chromium;
   (B) about 6 to about 38 wt % based on solids of a binder;
   (C) about 0 to about 70 wt % based on composition weight of a solvent; and
   (D) about 1 to about 2 wt % based on solids of an anti-settling agent.

15. A paint composition according to claim 14 wherein said binder forms an inorganic compound when said paint is dry.

16. A paint composition according to claim 14 wherein said binder forms an organic compound when said paint is dry.

17. A paint composition according to claim 14 wherein said binder is selected from the group consisting of ethyl silicate, sodium silicate, potassium silicate, phosphates, butyltitanates, and mixtures thereof.

18. A paint composition according to claim 14 wherein said binder is selected from the group consisting of epoxy esters, epoxy polyamides, urethanes, acrylics, phenoxies, chlorinated rubbers, polyvinylbutyrols, polyvinylacetates, and polystyrenes.

19. A paint composition according to claim 14 wherein said binder is an epoxy and said solvent is xylene, toluene, or a mixture thereof.

20. A paint composition according to claim 14 wherein said binder is silicate based and said solvent is xylene, an alcohol or a mixture thereof.

* * * * *